United States Patent

Aiba

(10) Patent No.: US 9,189,717 B2
(45) Date of Patent: Nov. 17, 2015

(54) IMAGE FORMING APPARATUS THAT TRANSMITS RESPONSE DATA FOR INFORMATION REQUESTING DATA AND RESPONDING METHOD

(71) Applicant: KYOCERA Document Solutions Inc., Osaka (JP)

(72) Inventor: Masaaki Aiba, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/326,896

(22) Filed: Jul. 9, 2014

(65) Prior Publication Data

US 2015/0015906 A1   Jan. 15, 2015

(30) Foreign Application Priority Data

Jul. 10, 2013   (JP) .................................. 2013-144737

(51) Int. Cl.
| | |
|---|---|
| G06F 3/12 | (2006.01) |
| G06K 15/00 | (2006.01) |
| G03G 15/00 | (2006.01) |
| G06F 1/32 | (2006.01) |
| H04N 1/00 | (2006.01) |

(52) U.S. Cl.
CPC ........ *G06K 15/4055* (2013.01); *G03G 15/5004* (2013.01); *G06F 1/32* (2013.01); *G06F 1/3284* (2013.01); *G06F 3/1221* (2013.01); *G06F 3/1232* (2013.01); *G06F 3/1285* (2013.01); *H04N 1/00896* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 2005/0007628 | A1* | 1/2005 | Yamano | G06F 1/3203 358/1.15 |
| 2005/0021728 | A1* | 1/2005 | Sugimoto | G06F 3/1204 709/223 |
| 2006/0039373 | A1* | 2/2006 | Nakamura | H04L 12/12 370/389 |
| 2006/0285867 | A1* | 12/2006 | Takahashi | G03G 15/80 399/70 |
| 2008/0155563 | A1* | 6/2008 | Nakamura | G03G 15/5075 719/318 |
| 2010/0007914 | A1* | 1/2010 | Watanabe | 358/1.15 |
| 2011/0188075 | A1* | 8/2011 | Narushima | G06F 1/3284 358/1.15 |
| 2012/0019848 | A1* | 1/2012 | Uemura | G06F 3/1221 358/1.9 |
| 2012/0224206 | A1* | 9/2012 | Takahashi | G06F 3/1229 358/1.13 |

FOREIGN PATENT DOCUMENTS

JP   2010-094925 A   4/2010

* cited by examiner

*Primary Examiner* — Marcus T Riley
(74) *Attorney, Agent, or Firm* — McDonnell Boehnen Hulbert & Berghoff LLP (57) ABSTRACT

An image forming apparatus according to an embodiment of the present disclosure includes a receiving unit, a controlling unit, an information accumulating unit, a sleep mode response data generating unit, and a transmitting unit. The receiving unit receives information requesting data. The controlling unit, in a normal mode, generates first response data after receiving the information requesting data. The information accumulating unit accumulates information associated with the first response data. The sleep mode response data generating unit, in a sleep mode, generates second response data on the basis of the information accumulated by the information accumulating unit. The transmitting unit transmits one of the first and the second response data.

12 Claims, 6 Drawing Sheets

| No. | OID | Data | |
|---|---|---|---|
| | | Type | Data Value |
| 1 | 1.3.6.1.2.1.2.2.1.1.1 | INTEGER | 1 |
| 2 | 1.2.6.1.2.1.2.2.1.2.1 | STRING | eth0 |
| 3 | 1.3.6.1.2.1.2.2.1.3.1 | INTEGER | 6 |
| 4 | 1.2.6.1.2.1.2.2.1.4.1 | INTEGER | 1500 |
| 5 | 1.3.6.1.2.1.2.2.1.5.1 | Gauge32 | 0 |
| ..... | ............. | ............. | ............. |

| IP Adrress | MAC Address (Ethernet Address) |
|---|---|
| 192.168.0.123 | 00:C0:EE:AE:AB:C8 |

IMAGE FORMING APPARATUS THAT TRANSMITS RESPONSE DATA FOR INFORMATION REQUESTING DATA AND RESPONDING METHOD

INCORPORATION BY REFERENCE

This application is based upon, and claims priority to corresponding Japanese Patent Application No. 2013-144737, filed in the Japan Patent Office on Jul. 10, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an image forming apparatus that receives information requesting data and transmits response data for the received information requesting data and to a responding method.

BACKGROUND

Energy conservation measures are taken for a typical image forming apparatus, such as a printer, or a multi-function peripheral (MFP). For example, if the image forming apparatus is unused for a specified time, it may shift to an energy conservation state (referred to below as the sleep mode). If the image forming apparatus shifts to the sleep mode, however, it may take time until the image forming apparatus shifts back to a state in which the user can use it (the state will be referred to below as the normal mode).

SUMMARY

In one example, a host computer transmits information requesting data via a network to the image forming apparatus placed in the sleep mode to check information about or associated with the image forming apparatus. As such, the image forming apparatus may shift from the sleep mode to the normal mode to transmit response data, possibly requiring time to shift from the sleep mode to the normal mode. If the host computer transmits information requesting data frequently to the image forming apparatus, the time required for the image forming apparatus to shift from the sleep mode to the normal mode may increase. As a result, the time during which the image forming apparatus is in the sleep mode may be shortened, lowering the energy conservation effect of implementing the sleep mode. In view of above-described example, an image forming apparatus can transmit response data when the image forming apparatus is in sleep mode. The image forming apparatus may have a controller that includes two central processing units (CPUs). One of the CPUs may be a main CPU that is responsive in the normal mode, and the other of the CPUs may be a sub-CPU that is responsive in the sleep mode. In the normal mode, response data may be stored in a random-access memory (RAM) in the main CPU. When the normal mode shifts to the sleep mode, the sub-CPU may retrieve frequently-used response data from the RAM in the main CPU and store the frequently-used response data in a RAM in the sub-CPU. In the sleep mode, therefore, the sub-CPU can transmit the frequently-used response data. However, a processing time taken to shift from the normal mode to the sleep mode may increase, since the sub-CPU may retrieve and store the frequently-used response data.

The present disclosure relates to an image forming apparatus that transmits response data for information requesting data and shortens the processing time taken to shift from the normal mode to the sleep mode, and to a responding method.

An image forming apparatus according to an embodiment of the present disclosure includes a receiving unit, a controlling unit, an information accumulating unit, a sleep mode response data generating unit, and a transmitting unit.

The receiving unit receives information requesting data. The controlling unit, in a normal mode, generates first response data after receiving the information requesting data. The information accumulating unit may accumulate information about or associated with the first response data. The sleep mode response data generating unit, in a sleep mode, generates second response data based on the information accumulated by the information accumulating unit. The transmitting unit may transmit one of the first and the second response data.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
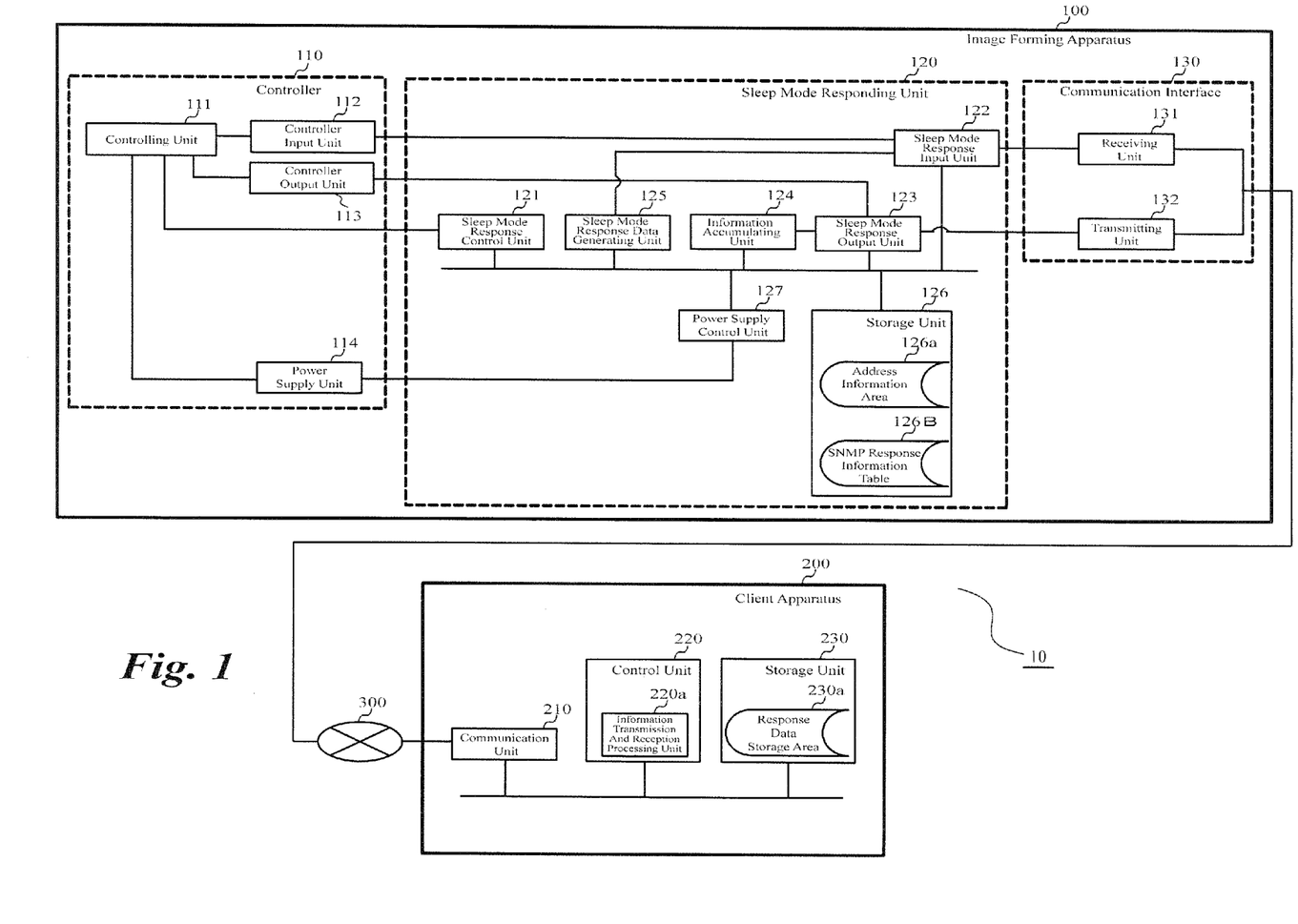
FIG. 1 is a schematic diagram illustrating a functional block configuration of an image forming system in an embodiment of the present disclosure.

The functional configuration of an image forming system 10 in the embodiment of the present disclosure will be described with reference to FIG. 1. The image forming system 10 in FIG. 1 may include an image forming apparatus 100 and a client apparatus 200; the image forming apparatus 100 and client apparatus 200 are connected via a network 300. The image forming apparatus 100 may include, for example, a printer or a multi-function peripheral (an MFP). Alternatively, the image forming apparatus 100 may receive information requesting data from the image forming apparatus 100. The image forming apparatus 100 may receive the information via the network 300 and may transmit response data in response to the received information requesting data. The client apparatus 200 includes, for example, a host computer that may transmit the information requesting data to the image forming apparatus 100 and receives the response data in response to transmitting the information requesting data.

The functional configuration of the image forming apparatus 100 will be described below. As illustrated in FIG. 1, the image forming apparatus 100 may include a controller 110 that may be a main-CPU, a sleep mode responding unit 120 that may be a sub-CPU, and a communication interface 130.

The controller 110 may receive the information requesting data while the image forming apparatus 100 is in a normal mode. Further, the controller 110 may generate response data and may output the generated response data. The controller 110 may include a controlling unit 111 that controls the controller 110. Further, a controller input unit 112, a controller output unit 113, and a power supply unit 114.

The controlling unit 111 may include a storage device such as a RAM or a read-only memory (ROM), and also may include a control device such as a microprocessing unit (MPU) or a CPU.

The controller input unit 112 may receive the information requesting data output from the sleep mode responding unit 120.

The controller output unit 113 may output the response data to the sleep mode responding unit 120.

The power supply unit 114 may supply power to the controller 110. When turned on, the power supply unit 114 may be controlled by the sleep mode responding unit 120. As such, the power supply unit 114 may supply power to the controller 110. When turned off, the power supply unit 114 may stop the power supply to the controller 110, then the image forming apparatus 100 may shift from the normal mode to a sleep mode.

While the image forming apparatus 100 is in the sleep mode, the sleep mode responding unit 120 may receive the information requesting data from the communication interface 130 and may output the response data to the communication interface 130. The sleep mode responding unit 120 may include a sleep mode response control unit 121, a sleep mode response input unit 122, a sleep mode response output unit 123, an information accumulating unit 124, a sleep mode response data generating unit 125, a storage unit 126, and a power supply control unit 127. As such, these units may be included in the sleep mode responding unit 120 and connected via a bus.

The sleep mode response control unit 121 may include the storage device such as the RAM or ROM and the control device such as the MPU or CPU.

The sleep mode response input unit 122 may receive the information requesting data output from the communication interface 130.

The sleep mode response output unit 123 may output the response data to the communication interface 130 and the information accumulating unit 124.

The information accumulating unit 124 may accumulate the response data output from the controller 110 via the sleep mode response output unit 123 to the communication interface 130.

While the image forming apparatus 100 is in the sleep mode, the sleep mode response data generating unit 125 generates the response data.

The storage unit 126, such as a flash memory or the like, may include an address information area 126a and a simple network management protocol (SNMP) response information table 126b. The configurations of the address information area 126a and SNMP response information table 126b will be descried further below. At the start of the image forming apparatus 100, no information is set in the SNMP response information table 126b.

The power supply control unit 127 controls the power supply unit 114 such that the controller 110 is turned on or off.

The communication interface 130 may include a removable local area network (LAN) interface to connect to the network 300. The communication interface 130 may include a receiving unit 131 and a transmitting unit 132.

The receiving unit 131 may receive a packet including the information requesting data transmitted from the client apparatus 200 and may output the information requesting data to the sleep mode responding unit 120.

The transmitting unit 132 may receive the response data from the sleep mode responding unit 120 and may transmit a packet including the response data to the client apparatus 200.

Next, the functional configuration of the client apparatus 200 will be described. As illustrated in FIG. 1, the client apparatus 200 may include a communication unit 210, a control unit 220, and a storage unit 230.

The communication unit 210 may include a removable LAN interface to connect to the network 300.

The control unit 220 may include the storage device such as the RAM or ROM and the control device such as the CPU. The control unit 220 controls the client apparatus 200 that may include various input/output (I/O) units, an interface such as a universal serial bus (USB), a bus controller, and the like. The control unit 220 may include an information transmission and reception processing unit 220a that may transmit the information requesting data to the image forming apparatus 100 and may receive the response data from the image forming apparatus 100.

The storage unit 230, such as the flash memory or the like, stores program and data that are used in a process executed by the control unit 220. The storage unit 230 may include a response data storage area 230a that may store the response data received from the image forming apparatus 100.

Figure 2A:
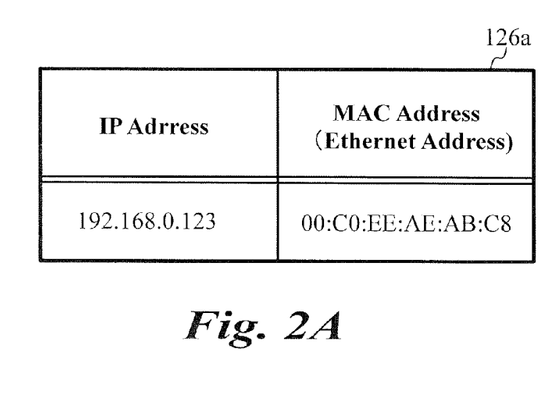
FIG. 2A is a schematic diagram illustrating a configuration of an address information area in an image forming apparatus in the image forming system.
Figure 2B:
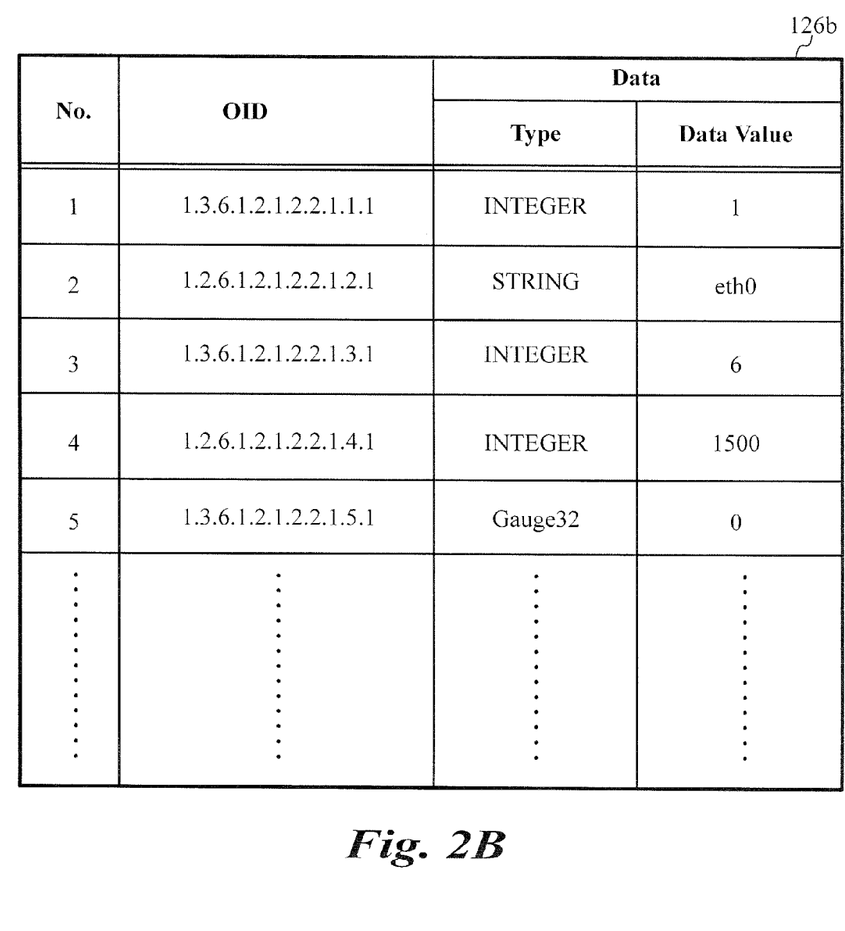
FIG. 2B is a schematic diagram illustrating a configuration of a simple network management protocol (SNMP) response information table in the image forming apparatus.

Next, the configurations of the address information area 126a and SNMP response information table 126b in the storage unit 126 of the sleep mode responding unit 120 will be described with reference to FIG. 2.

The configuration of the address information area 126a illustrated in FIG. 2A will be described first. The address information area 126a has an Internet Protocol (IP) address field and a media access control (MAC) address field (the MAC address is an Ethernet address). The IP address field may store the IP address of the image forming apparatus 100 that may be set in the response data. The MAC address field may store a MAC address corresponding to the IP address of the image forming apparatus 100 that may be set in the response data.

Next, the configuration of the SNMP response information table 126b illustrated in FIG. 2B will be described. In the SNMP response information table 126b, information about or associated with the response data corresponding to the information requesting data in SNMP may be accumulated. The SNMP response information table 126b has a number ("No.") field, an object identifier (OID) field, and a data field. The No. field may include ascending numbers where each number is assigned to a combination of a respective OID in the OID field and respective data in the data field. In the OID field, an identifier may be stored that is assigned to distinguish an object of individual management information stored in a management information base (MIB) in SNMP. In the data field, the data may be stored that corresponds to the OID set in the response data. The data field may be divided into a "type" field and a "data value" field. In the type field, the type of each data item may be stored. If, for example, the type of data is an integer, "INTEGER" may be stored. In the data value field, an actual data value may be stored.

Figure 3:
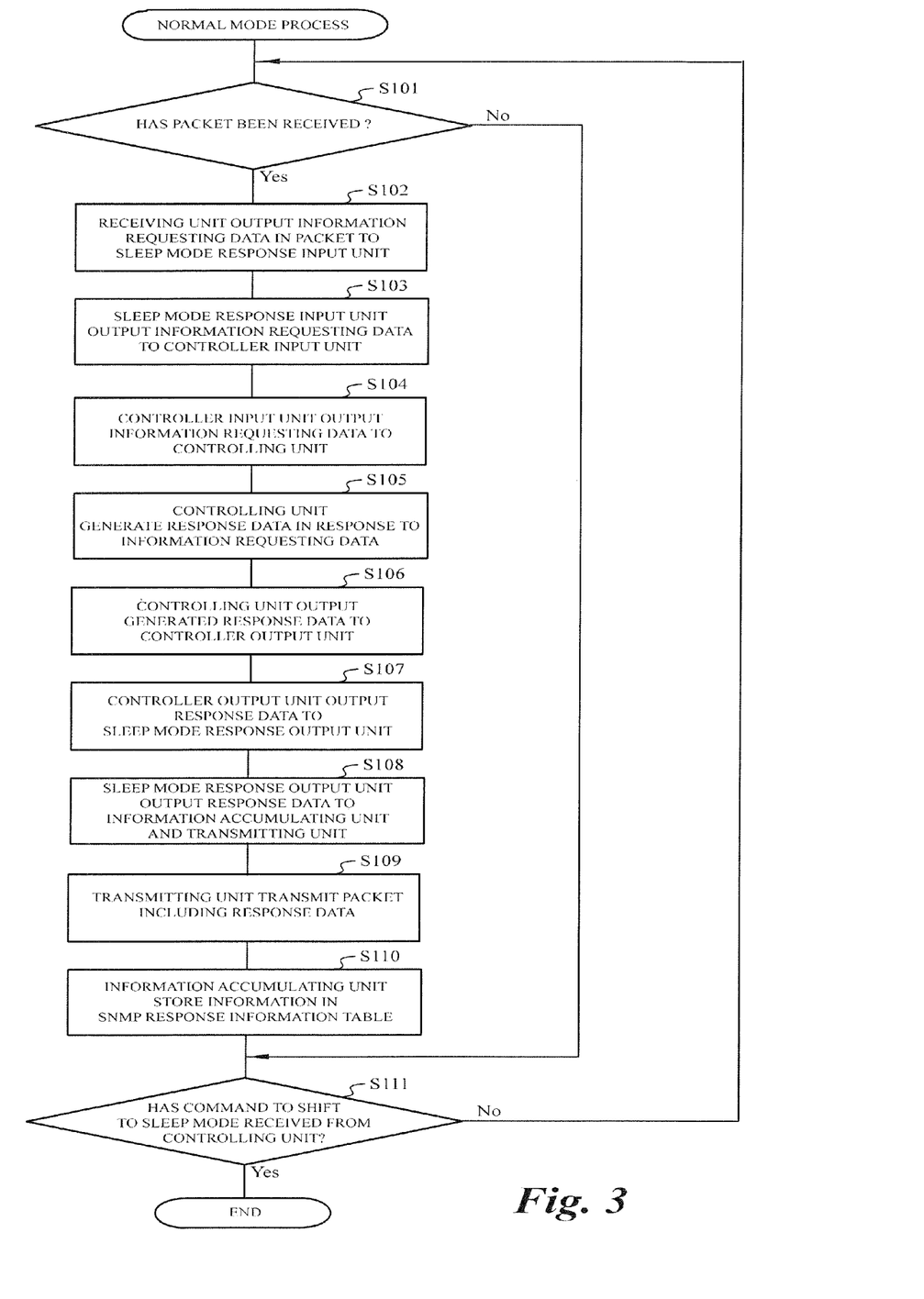
FIG. 3 is a flowchart of a normal mode process in the image forming apparatus.

Next, a normal mode process executed by the image forming apparatus 100 in an embodiment of the present disclosure will be described with reference to FIG. 3. When the image forming apparatus 100 is started, it operates in the normal mode.

In step S101, the receiving unit 131 determines whether the packet has been received. If the packet has been received (the result in step S101 is "Yes"), the sequence proceeds to step S102. If no packet has been received (the result in step S101 is "No"), the sequence proceeds to step S111.

In step S102, which is executed after a "Yes" result has been produced in step S101, the receiving unit 131 may output the information requesting data in the packet to the sleep mode response input unit 122.

In step 103, the sleep mode response input unit 122 may receive the information requesting data and may output it to the controller input unit 112.

In step S104, the controller input unit 112 may receive the information requesting data and may output it to the controlling unit 111.

In step S105, the controlling unit 111 may receive the information requesting data and generates the response data in response to the information requesting data.

In step S106, the controlling unit 111 may output the generated response data to the controller output unit 113.

In step S107, the controller output unit 113 may receive the response data and may output it to the sleep mode response output unit 123.

In step S108, the sleep mode response output unit 123 may receive the response data and may output it to the information accumulating unit 124 and transmitting unit 132.

In step S109, the transmitting unit 132 may receive the response data and may transmit the packet including the response data via the network 300 to a transmission destination. If the packet may include the response data generated in response to the information requesting data in the packet received from the client apparatus 200, the packet is transmitted to the client apparatus 200.

In step S110, the information accumulating unit 124 may receive the response data. If the response data is SNMP response data, the information accumulating unit 124 retrieves the OID and the data from the response data and stores them in the SNMP response information table 126b.

In step S111, which is executed after step S110 or after a "No" result has been produced in step S101, the sleep mode response control unit 121 determines whether it has received a command to shift to the sleep mode from the controlling unit 111. If the sleep mode response control unit 121 has received a command to shift to the sleep mode (the result in step S111 is "Yes"), the normal mode process is terminated. If the sleep mode response control unit 121 has not received a command to shift to the sleep mode (the result in step S111 is No), the sequence returns to step S101. The controlling unit 111 may output the command to shift to the sleep mode to the sleep mode response control unit 121 after a specified time has elapsed.

Figure 4:
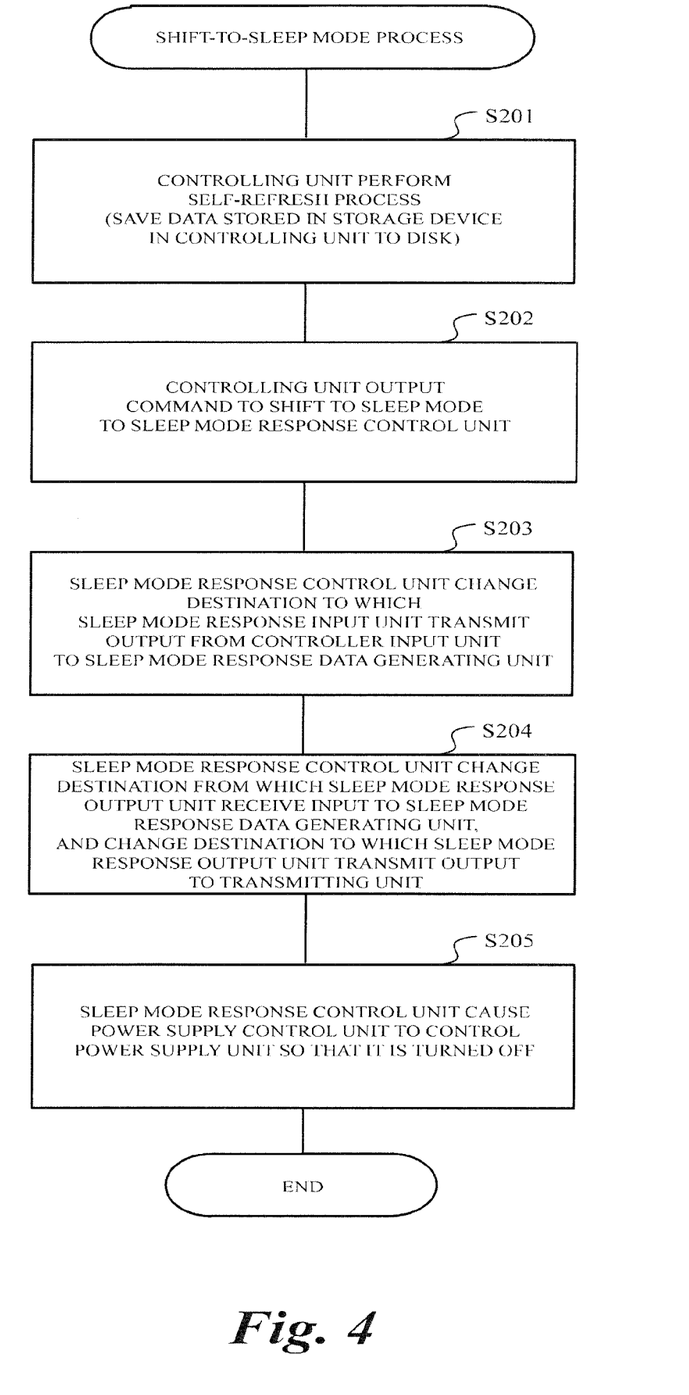
FIG. 4 is a flowchart of a process to shift from a normal mode to a sleep mode in the image forming apparatus.

Next, a process for shifting to the sleep mode (referred to below as a "shift-to-sleep mode process") executed by the image forming apparatus 100 in the embodiment of the present disclosure will be described with reference to FIG. 4. Upon completion of the normal mode process, the image forming apparatus 100 may start the shift-to-sleep mode process.

In step S201, the controlling unit 111 saves data stored in the storage device in the controlling unit 111 to a disk. This process is referred to as self-refresh process.

In step S202, the controlling unit 111 may output a command to shift to the sleep mode via sleep mode response control unit 121.

In step S203, the sleep mode response control unit 121 may change the destination to which the sleep mode response input unit 122 may transmit an output from the controller input unit 112 to the sleep mode response data generating unit 125.

In step S204, the sleep mode response control unit 121 may change the destination from which the sleep mode response output unit 123 may receive an input from the controller output unit 113 to the sleep mode response data generating unit 125. The sleep mode response control unit 121 also may change the destination to which the sleep mode response output unit 123 may transmit an output from both the transmitting unit 132 and the information accumulating unit 124 to the transmitting unit 132 alone.

In step S205, the sleep mode response control unit 121 causes the power supply control unit 127 to control the power supply unit 114 so that it is turned off, terminating the shift-to-sleep mode process. When the power supply unit 114 is turned off, power is no longer supplied and the normal mode shifts to the sleep mode.

Figure 5:
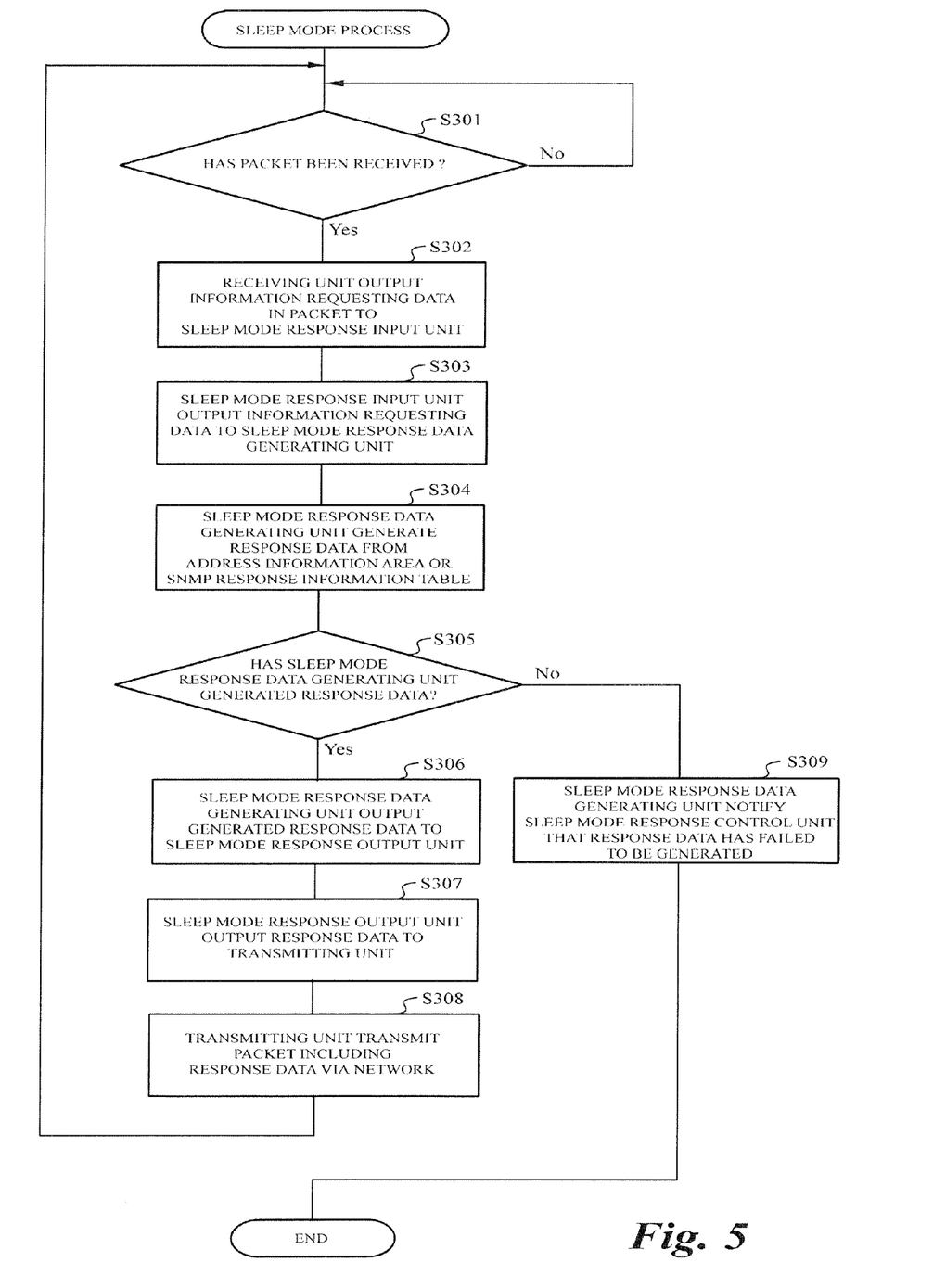
FIG. 5 is a flowchart of a sleep mode process in the image forming apparatus.

Next, a sleep mode process executed by the image forming apparatus 100 in the embodiment of the present disclosure will be described with reference to FIG. 5.

In step S301, the receiving unit 131 determines whether the packet has been received. If the packet has been received (the result in step S301 is "Yes"), the sequence proceeds to step S302. If no packet has been received (the result in step S301 is "No"), the sequence returns to step S301.

In step S302, which is executed after a "Yes" result has been produced in step S301, the receiving unit 131 may output the information requesting data in the packet to the sleep mode response input unit 122.

(Step S303)

In step S303, the sleep mode response input unit 122 may receive the information requesting data and may output it to the sleep mode response data generating unit 125. In shift-to-sleep mode process, the destination to which the sleep mode response input unit 122 may transmit an output has been switched to the sleep mode response data generating unit 125.

In step S304, the sleep mode response data generating unit 125 retrieves information from the address information area 126a or SNMP response information table 126b and generates the response data.

In step S305, the sleep mode response control unit 121 determines whether the sleep mode response data generating unit 125 has generated the response data. If the response data has been generated (the result in step S305 is "Yes"), the sequence proceeds to step S306. If the response data has not been generated (the result in step S305 is "No"), the sequence proceeds to step S309. For example, a case in which response data fails to be generated may include the case in which information in the address information area 126a or SNMP response information table 126b is insufficient, and the case in which data other than in Address Resolution Protocol (ARP) or SNMP is generated.

(Step S306)

In step S306, which is executed after a "Yes" result has been produced in step S305, the sleep mode response data generating unit 125 may output the generated response data to the sleep mode response output unit 123.

In step S307, the sleep mode response output unit 123 may receive the response data and may output it to the transmitting unit 132.

In step S308, the transmitting unit 132 may receive the response data and may transmit the packet including the response data via the network 300 to a transmission destination. If the packet may include, for example, the response data generated in response to the information requesting data in the packet received from the client apparatus 200, the packet is transmitted to the client apparatus 200.

In step S309, which is executed after a "No" result has been produced in step S305, when the sleep mode response data generating unit 125 notifies the sleep mode response control unit 121 that response data has failed to be generated, the sleep mode response control unit 121 terminates the sleep mode process.

Figure 6:
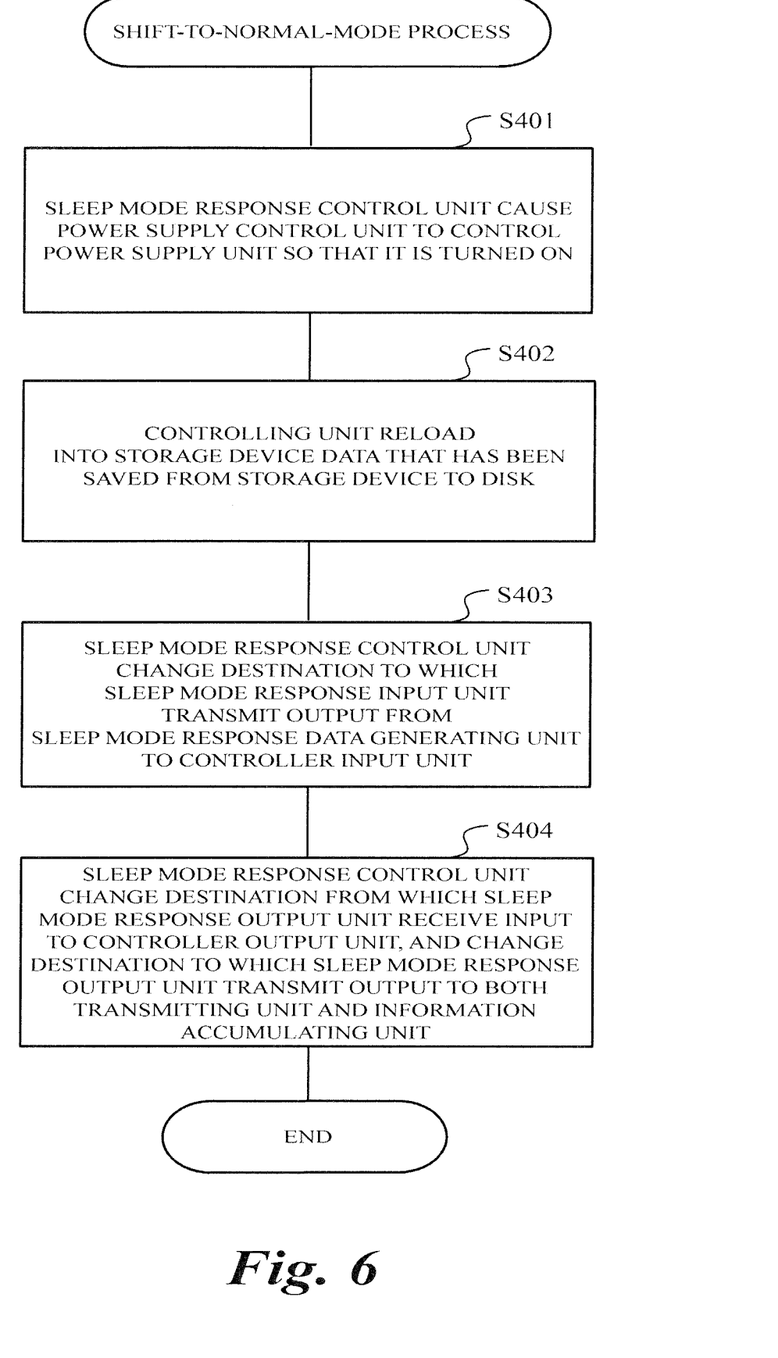
FIG. 6 is a flowchart of a process to shift from the sleep mode to the normal mode in the image forming apparatus.

Next, a process to shift to the normal mode (referred to below as a "shift-to-normal-mode process") executed by the image forming apparatus 100 in the embodiment of the present disclosure will be described with reference to FIG. 6. Upon completion of sleep mode process, the image forming apparatus 100 starts shift-to-normal-mode process.

In step S401, the sleep mode response control unit 121 causes the power supply control unit 127 to control the power supply unit 114 so that it is turned on. When the power supply unit 114 is turned on, power starts to be supplied.

In step S402, the controlling unit 111 reloads, into the storage device, the data saved from the storage device to the disk.

In step S403, the sleep mode response control unit 121 may change the destination to which the sleep mode response input unit 122 may transmit an output from the sleep mode response data generating unit 125 to the controller input unit 112.

In step S404, the sleep mode response control unit 121 may change the destination from which the sleep mode response output unit 123 may receive an input from the sleep mode response data generating unit 125 to the controller output unit 113. The sleep mode response control unit 121 also may change the destination to which the sleep mode response output unit 123 may transmit an output from the transmitting unit 132 alone to both the transmitting unit 132 and the information accumulating unit 124, possibly terminating the shift-to-normal-mode process.

Accordingly, in the normal mode, the image forming apparatus 100 may output the information requesting data in the packet received at the communication interface 130 to the controller 110 via the sleep mode responding unit 120. In the controller 110, the controlling unit 111 generates response data in response to the information requesting data. The response data is output via the sleep mode responding unit 120 to the communication interface 130. The communication interface 130 may transmit the packet including the response data.

When the response data passes through the sleep mode responding unit 120, the information accumulating unit 124 in the sleep mode responding unit 120 may accumulate the information that is needed to generate the response data in the sleep mode. Thus, the information used to generate the response data in the sleep mode is accumulated in the sleep mode responding unit 120. In the sleep mode, the sleep mode response data generating unit 125 can retrieve the information accumulated in the sleep mode responding unit 120 in the normal mode, and can use the information to generate the response data. This eliminates the need to transmit the information for generating the response data on switching from the normal mode to the sleep mode, shortening the processing time taken to shift from the normal mode to the sleep mode.

That is, in the image forming apparatus 100 as described above, the information for generating the response data in the sleep mode is accumulated in the normal mode. In the sleep mode, the response data can be generated from the accumulated information without transmitting the accumulated information. This can shorten the processing time taken to shift from the normal mode to the sleep mode.

If the sleep mode response data generating unit 125 cannot generate the response data from the accumulated information, the sleep mode responding unit 120 controls the power supply unit 114 so that it is turned on to shift to the normal mode. In the normal mode, the response data is generated. This enables the response data to be reliably generated and transmitted.

While various aspects and embodiments have been disclosed herein, other aspects and embodiments are possible. Other designs may be used in which the above-described components are each present.

Although, in the embodiment, an example in which the single client apparatus 200 is connected to the network 300 as the host computer has been described, it is also possible to connect the plurality of host computers to the network 300, in which case the image forming apparatus 100 can receive the packet of the response data from the plurality of host computers.

Although, in the embodiment, the example in which the information accumulated by the information accumulating unit 124 is used to generate ARP or SNMP data has been described, this is not a limitation; various types of the response data for the information request data can be accumulated.

Although, in the embodiment, the controller 110 may receive the information requesting data output from the communication interface 130 via the sleep mode responding unit 120 in the normal mode, the controller 110 can also receive information requesting data directly from the communication interface 130 without passing through the sleep mode responding unit 120.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   a receiving unit that receives information requesting data;
   a controlling unit that, in a normal mode, generates first response data after receiving the information requesting data;
   an information accumulating unit that accumulates information associated with the first response data;

a sleep mode response data generating unit that, in a sleep mode, generates second response data based on the accumulated information;

a transmitting unit that transmits one of the first response data and the second response data;

a sleep mode response output unit that transmits one of the first response data and the second response data to the transmitting unit or the information accumulating unit; and a sleep mode response control unit that (i) in the normal mode, transmits to the transmitting unit and the information accumulating unit the first response data that is transmitted from the controlling unit via the sleep mode response output unit, and (ii) in the sleep mode, transmits to the transmitting unit the second response data that is transmitted from the sleep mode response data generating unit via the sleep mode response output unit.

2. The image forming apparatus according to claim 1, further comprising a sleep mode response input unit that receives an input comprising the information requesting data, wherein (i) in the normal mode, the sleep mode response control unit transmits to the controlling unit the information requesting data, and (ii) in the sleep mode, the sleep mode response control unit transmits to the sleep mode response data generating unit the information requesting data.

3. The image forming apparatus according to claim 1, further comprising:
a power supply unit that supplies power to a CPU including the controlling unit in the normal mode; and
a power supply control unit that controls the power supply unit to be turned on in the normal mode and turned off in the sleep mode.

4. The image forming apparatus according to claim 1, further comprising a storage unit that stores the information associated with the first response data, wherein the information accumulating unit, in the normal mode, retrieves the information from the first response data, and stores the information in the storage unit.

5. The image forming apparatus according to claim 1, further comprising a controller and a sleep mode responding unit, wherein in the normal mode, the first response data is stored in a random-access memory (RAM) of the controller, and wherein in the sleep mode, the second response data is stored in a storage unit of the sleep mode responding unit.

6. The image forming apparatus according to claim 1, wherein the information accumulating unit receives the first response data, and if the first response data comprises simple network management protocol (SNMP) response data, the information accumulating unit retrieves an object identifier (OID) from the first response data and stores the SNMP response data and the OID in an SNMP response information table.

7. A method executed by an image forming apparatus, comprising:
receiving by a receiving unit information requesting data;
generating by a controlling unit, in a normal mode, first response data after receiving the information requesting data;

accumulating by an information accumulating unit information associated with the first response data generated in the normal mode;

generating by a sleep mode response data generating unit, in a sleep mode, second response data based on the information accumulated in the normal mode;

transmitting by a transmitting unit one of the first response data and the second response data;

transmitting by a sleep mode response output unit one of the first response data and the second response data to the transmitting unit or the information accumulating unit;

transmitting, in the normal mode, by a sleep mode response control unit to the transmitting unit and the information accumulating unit the first response data that is transmitted from the controlling unit via the sleep mode response output unit; and transmitting, in the sleep mode, by the sleep mode response control unit to the transmitting unit the second response data that is transmitted from the sleep mode response data generating unit via the sleep mode response output unit.

8. A method according to claim 7, further comprising:
controlling to supply power to a CPU in the image forming apparatus by turning the power on in the normal mode; and
controlling to supply power to the CPU by turning the power off in the sleep mode.

9. The method of claim 7, further comprising:
receiving by a sleep mode response input unit the information requesting data;
transmitting, in the normal mode, by the sleep mode response control unit to the controlling unit the information requesting data; and
transmitting, in the sleep mode, by the sleep mode response control unit to the sleep mode response data generating unit the information requesting data.

10. The method of claim 7, further comprising:
retrieving, in the normal mode, by the information accumulating unit the information associated with the first response data from the first response data; and
storing the information in a storage unit.

11. The method of claim 7, further comprising:
storing, in the normal mode, by a controller the first response data in a random-access memory (RAM) of the controller; and
storing, in the sleep mode, by a sleep mode responding unit the second response data in a storage unit of the sleep mode responding unit.

12. The method of claim 7, further comprising receiving by the information accumulating unit the first response data, wherein if the first response data comprises simple network management protocol (SNMP) response data, the method further comprises:
retrieving by the information accumulating unit an object identifier (OID) from the first response data; and
storing by the information accumulating unit the SNMP response data and the OID in an SNMP response information table.

* * * * *